(No Model.)
W. I. ADAMS.
PHOTOGRAPHIC SHUTTER.
No. 536,253. Patented Mar. 26, 1895.
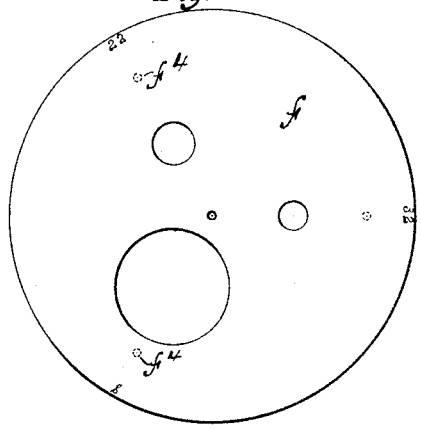
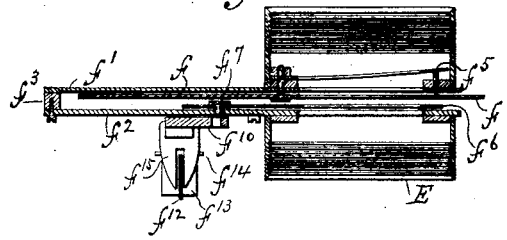
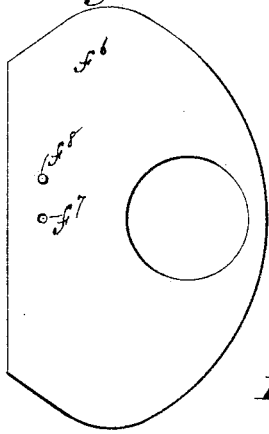
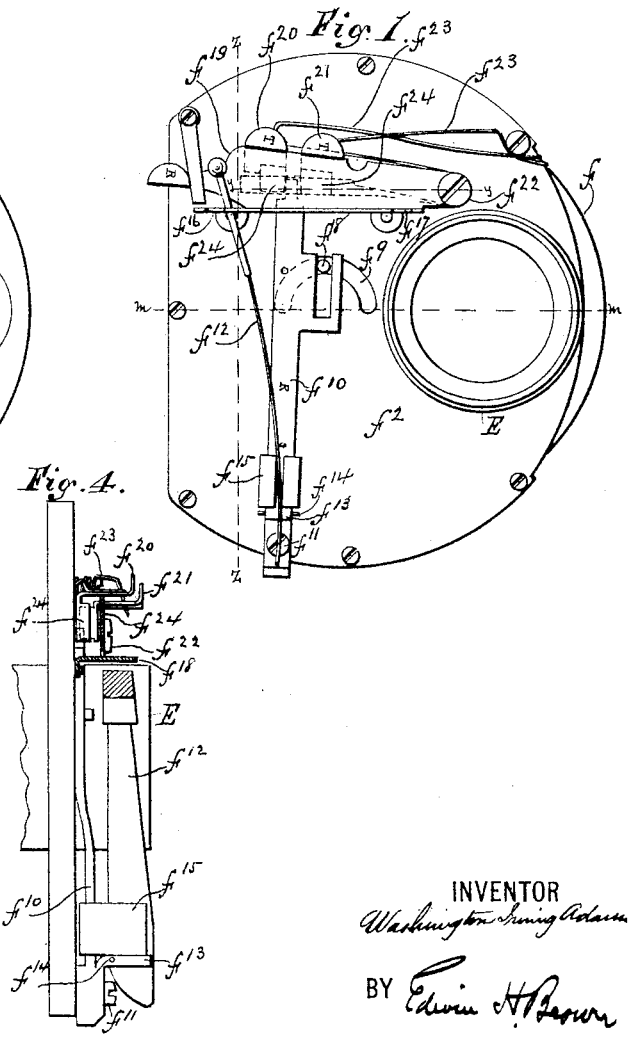
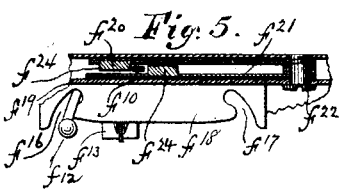
WITNESSES:
INVENTOR
Washington Irving Adams
BY Edwin H. Brown
HIS ATTORNEY

UNITED STATES PATENT OFFICE.

WASHINGTON IRVING ADAMS, OF MONTCLAIR, NEW JERSEY, ASSIGNOR TO THE SCOVILL & ADAMS COMPANY, OF NEW YORK, N. Y.

PHOTOGRAPHIC SHUTTER.

SPECIFICATION forming part of Letters Patent No. 536,253, dated March 26, 1895.

Application filed August 7, 1891. Serial No. 401,975. (No model.)

*To all whom it may concern:*

Be it known that I, WASHINGTON IRVING ADAMS, of Montclair, in the county of Essex and State of New Jersey, have invented a certain new and useful Improvement in Shutters for Photographic Cameras, of which the following is a specification.

This invention relates to shutters for photographic cameras, and has for its object to simplify the mechanism and render it positive and efficient in operation.

The improvements consist in certain novel devices and combinations of parts, all as hereinafter fully described in detail and pointed out in the claims, reference being had to the accompanying drawings forming part of this specification, upon which the several letters of reference indicate like parts in all the figures.

In said drawings, Figure 1 is a front view of the shutter mechanism embodying my improvement. Fig. 2 is a front view of a rotary stop employed in connection with the shutter mechanism proper. Fig. 3 is a front view of the shutter detached. Fig. 4 is a side sectional elevation of the shutter mechanism, the plane of the section being at the dotted line $z-z$, Fig. 1. Fig. 5 is a horizontal section taken on line $y-y$, Fig. 1. Fig. 6 is a horizontal section taken on line $m-m$, Fig. 1.

The lens tube E is composed of two sections, the main section being attached to the front block of the camera and the other section being secured to the forward end of the main section. The outer section of the lens tube has mounted upon it a shallow box composed of plates $f'$ $f^2$ arranged one in front of the other and united to a rim $f^3$ interposed between them. This rim has an opening in one side through which protrudes the edge of a stop $f$ consisting of a plate provided with a number of holes and pivoted at its center to the box $f'$ $f^2$ $f^3$. By turning the stop, any one of its holes may be brought opposite the center of the lens tube.

The rear of the stop $f$ has a number of small recesses $f^4$ into which a spring detent $f^5$ fastened to the rear plate $f'$ of the box $f'$ $f^2$ $f^3$ may enter when one of the holes of the stop is opposite the lens tube.

The shutter consists of a plate $f^6$ pivotally connected by a pin passing through a hole $f^7$ to the forward plate $f^2$ of the box $f'$ $f^2$ $f^3$. This shutter has a single opening which may be brought opposite to the lens tube or may be made to pass the lens tube. A pin $f^8$ extends forwardly from the shutter through an arc-shaped slot $f^9$ formed in the front plate $f^2$ of the box $f'$ $f^2$ $f^3$ and into a slot or notch formed in a lever $f^{10}$ which is fulcrumed near the lower end by a pin $f^{11}$ to said plate $f^2$. This lever has combined with it a spring $f^{12}$ which at the lower end is fastened to the lever in such way that it cannot move laterally without bending, but can move forwardly and backwardly. This is accomplished by fitting the lower edge of the spring to a bracket $f^{13}$ and passing through the bracket and spring a pin $f^{14}$. The tension of this spring may be varied by vertically adjusting a block $f^{15}$ which slides along the lever $f^{10}$ and is forked to embrace the spring $f^{12}$. Obviously, by adjusting the block $f^{15}$, it will reduce the length of the spring which will be active and may be adjusted conversely from a downward adjustment of the block.

The upper end of the spring $f^{12}$ may be fitted into either of two notches $f^{16}$ $f^{17}$ formed in a plate $f^{18}$ which is fastened to the front plate $f^2$ of the box $f'$ $f^2$ $f^3$. When the spring is engaged with the notch $f^{16}$, it will tend to swing the lever $f^{10}$ to the left and consequently rotate or oscillate the shutter to the left. The engagement of the spring with the notch $f^{17}$ will cause a reverse movement of the lever $f^{10}$ and shutter.

It only remains to explain the detents whereby the shutter is retained in position. They consist, as here shown, of three levers $f^{19}$ $f^{20}$ $f^{21}$, all fulcrumed to a pin $f^{22}$, which passes through them and through the two plates $f'$ $f^2$ of the box $f'$ $f^2$ $f^3$, being engaged with a tapped hole in the back plate $f'$. The levers $f^{20}$ $f^{21}$ are provided at or near their free ends with lugs that extend over the upper edge of the lever $f^{19}$, so that when the lever $f^{19}$ is raised, the other levers $f^{20}$ $f^{21}$ will also be raised. Springs $f^{23}$ fastened to the box $f'$ $f^2$ $f^3$ and impinging against the levers $f^{20}$ $f^{21}$ impel said levers downward, and, as these levers bear upon the lever $f^{19}$, the latter will also be impelled downward by said spring. Each of the levers $f^{20}$ $f^{21}$ has a projection $f^{24}$, which will obtrude itself to one side or the other of the upper end of the lever $f^{10}$. The projections $f^{24}$ of both levers $f^{20}$ $f^{21}$ will, when the shutter is set be on the same side of the lever $f^{10}$. By raising one of these levers the shutter will be permitted to make a partial movement and afterward by raising the second lever the movement of the shutter may be completed. If the lever $f^{19}$ is raised, it will raise both the levers $f^{20}$ $f^{21}$ and allow the shutter to make its entire movement at once.

What I claim as my invention, and desire to secure by Letters Patent, is—

1. In a camera shutter, the combination with a lens tube, of a shutter plate, a pivoted lever for operating the shutter plate, a spring secured to the lever, a stationary plate provided with portions on opposite sides of the center line of vibration of the lever suitable for engaging with the free end of said spring, and detent mechanism for holding the shutter plate in an adjusted position, substantially as specified.

2. In a camera shutter, the combination with a lens tube, of a shutter plate, a pivoted lever for operating the shutter plate, a spring secured to the lever, means carried by the lever for adjusting the tension of the spring, a stationary plate provided with portions on opposite sides of the center line of vibration of the lever suitable for engaging with the free end of said spring, and detent mechanism for holding the shutter plate in an adjusted position, substantially as specified.

3. In a camera, the combination with a lens tube, of a shutter, a main lever for imparting motion to the shutter plate, a spring for actuating said lever, a stationary notched plate with which the spring may be engaged in either of two positions to cause the main lever to reverse the movement of the shutter and levers $f^{20}$ $f^{21}$ for holding the main lever until it is desired to operate the shutter, and the lever $f^{19}$ for releasing said levers, substantially as specified.

4. In a shutter mechanism for cameras, the combination with a lens tube, of the pivoted shutter plate having a pin or projection, as $f^8$, the slotted lever, as $f^{10}$, engaging said pin, the spring, as $f^{12}$, adapted to be set so to move said slotted lever in either of two directions, the stationary plate, as $f^{18}$, having notches for holding said spring in either of two positions,—the levers, $f^{20}$, $f^{21}$, held by springs and having projections, as $f^{24}$, adapted to engage the free end of the slotted lever, and to be separately released therefrom, and the lever $f^{19}$, for causing said levers $f^{20}$, $f^{21}$, to simultaneously release the slotted lever, substantially as and for the purposes set forth.

In testimony whereof I have signed my name to this specification in the presence of two subscribing witnesses.

WASHINGTON IRVING ADAMS.

Witnesses:
   HENRY P. SEE,
   WILLIAM PROCTOR.